United States Patent
Nakamura et al.

(10) Patent No.: US 9,002,609 B2
(45) Date of Patent: Apr. 7, 2015

(54) VEHICLE BRAKE CONTROL SYSTEM

(75) Inventors: Kensuke Nakamura, Isehara (JP); Noriaki Fujiki, Ebina (JP); Keigo Ajiro, Zama (JP)

(73) Assignee: Nissan Motor Co., Ltd., Yokohama (JP)

( * ) Notice: Subject to any disclaimer, the term of this patent is extended or adjusted under 35 U.S.C. 154(b) by 245 days.

(21) Appl. No.: 13/701,165

(22) PCT Filed: Jun. 6, 2011

(86) PCT No.: PCT/IB2011/001243
§ 371 (c)(1),
(2), (4) Date: Nov. 30, 2012

(87) PCT Pub. No.: WO2011/154801
PCT Pub. Date: Dec. 15, 2011

(65) Prior Publication Data
US 2013/0085650 A1 Apr. 4, 2013

(30) Foreign Application Priority Data

Jun. 7, 2010 (JP) .................................. 2010-129558

(51) Int. Cl.
*B60T 7/12* (2006.01)
*B60T 8/17* (2006.01)
(Continued)

(52) U.S. Cl.
CPC ... *B60T 8/17* (2013.01); *B60T 1/10* (2013.01); *B60T 13/745* (2013.01);
(Continued)

(58) Field of Classification Search
USPC ............... 701/69, 70, 72, 96; 303/119.1, 152; 290/40 C; 180/271
See application file for complete search history.

(56) References Cited

U.S. PATENT DOCUMENTS 6,600,974 B1 7/2003 Traechtler
2002/0143456 A1* 10/2002 Grob et al. ...................... 701/70
(Continued)

FOREIGN PATENT DOCUMENTS

CN 1315912 A 10/2001
CN 1681679 A 10/2005
(Continued)

OTHER PUBLICATIONS

International Search Report of PCT/IB2011/001243 dated Oct. 5, 2011, mailed Oct. 25, 2011.
(Continued)

*Primary Examiner* — James Trammell
*Assistant Examiner* — Sanjeev Malhotra
(74) *Attorney, Agent, or Firm* — Global IP Counselors, LLP (57) ABSTRACT

A vehicle brake control system includes a regenerative braking control component, a frictional braking control component, a calculating component and a controlling component. The regenerative braking control component controls a regenerative braking device to provide a regenerative braking torque. The frictional braking control component controls a frictional braking device to provide a frictional braking torque. The calculating component calculates a regenerative braking torque filter processing value based on a fluctuation frequency of the regenerative braking torque. The controlling component, during a first condition, operates a motorized power assist control device based on the regenerative braking torque filter processing value, instead of the regenerative braking torque, to moderate the frictional braking torque, such that the regenerative braking torque and the moderated frictional braking torque provide a target braking torque based on a braking operation.

19 Claims, 5 Drawing Sheets

(51) Int. Cl.
   *B60T 1/10* (2006.01)
   *B60T 13/74* (2006.01)
   *B60W 10/08* (2006.01)
   *B60W 10/188* (2012.01)
   *B60W 30/18* (2012.01)
   *B60T 8/1755* (2006.01)
   *B60T 8/176* (2006.01)
   *B60W 50/00* (2006.01)

(52) U.S. Cl.
   CPC ......... *B60T 2270/604* (2013.01); *B60W 10/08* (2013.01); *B60W 10/188* (2013.01); *B60W 30/18127* (2013.01); *B60W 2050/0052* (2013.01); *B60T 8/1755* (2013.01); *B60T 8/176* (2013.01)

(56) References Cited

U.S. PATENT DOCUMENTS

| | | | |
|---|---|---|---|
| 2002/0180262 A1* | 12/2002 | Hara et al. | 303/119.1 |
| 2003/0062770 A1* | 4/2003 | Sasaki et al. | 303/152 |
| 2003/0102673 A1* | 6/2003 | Nada | 290/40 C |
| 2003/0154016 A1* | 8/2003 | Manaka | 701/96 |
| 2003/0184154 A1* | 10/2003 | Joyce | 303/152 |
| 2003/0184155 A1* | 10/2003 | Crombez et al. | 303/152 |
| 2004/0122579 A1* | 6/2004 | Ashizawa et al. | 701/70 |
| 2004/0140143 A1* | 7/2004 | Saeki et al. | 180/271 |
| 2006/0004507 A1* | 1/2006 | Teslak et al. | 701/69 |
| 2006/0036357 A1 | 2/2006 | Isono et al. | |
| 2009/0115242 A1 | 5/2009 | Ohtani et al. | |
| 2011/0054757 A1* | 3/2011 | Casella et al. | 701/72 |

FOREIGN PATENT DOCUMENTS

| | | |
|---|---|---|
| DE | 102004044599 | 4/2005 |
| FR | 2909956 A1 | 6/2008 |
| JP | 2004-106663 A | 4/2004 |
| JP | 2006-281992 A | 10/2006 |
| JP | 2006-312384 A | 11/2006 |
| JP | 2007-191133 A | 8/2007 |
| JP | 2008-030599 A | 2/2008 |
| JP | 2008-062727 A | 3/2008 |

OTHER PUBLICATIONS

An English translation of the Japanese Office Action for the corresponding Japanese patent application No. 2010-129558 issued on Jan. 21, 2014.

An English translation of the Chinese Office Action for the corresponding Chinese patent application No. 201180026736.0 issued on Jun. 18, 2014.

An English translation of the Russian Notice of Allowance for the corresponding Russian patent application No. 2012155598/11(088036) issued on Feb. 18, 2014.

* cited by examiner

VEHICLE BRAKE CONTROL SYSTEM

CROSS-REFERENCE TO RELATED APPLICATIONS

This application is a U.S. National stage of International Application No. PCT/IB2011/001243, filed Jun. 6, 2011. This application claims priority to Japanese Patent Application No. 2010-129558, filed on Jun. 7, 2010. The entire disclosure of Japanese Patent Application No. 2010-129558 is hereby incorporated herein by reference.

BACKGROUND

1. Field of the Invention

The present invention generally relates to a vehicle brake control system. More particularly, the present invention relates to a vehicle brake control system that cooperatively controls a frictional braking system and a regenerative braking system to enhance the feel of the braking operation in a transient period in which the regenerative braking torque changes suddenly.

2. Background Information

A typical vehicle brake control device controls regenerative braking and frictional braking components to achieve a target braking torque in response to a braking operation or other driving state. Generally, the vehicle brake control device will operate the regenerative braking components to perform regenerative braking to attempt to achieve the desired braking torque. If the desired braking torque cannot be achieved with regenerative braking, the control device can operate the frictional braking components to supply additional braking torque which compensates for the shortfall in braking torque provided by the regenerative braking components. Therefore, since regenerative braking is used as much as possible, the use of frictional braking can be kept to a minimum. Accordingly, it may be possible to maximize or at least increase the amount of kinetic energy of the vehicle that is recovered as electrical energy due to regenerative braking while minimizing the loss of vehicle kinetic energy as heat due to frictional braking. As a result, energy efficiency, fuel consumption and electrical consumption can be enhanced.

An example of a frictional braking system is described in Japanese Laid-Open Patent Application No. 2009-154814. The frictional braking system includes a motorized power assist-type master cylinder which operates in response to a braking operation via a brake pedal or the like. The master cylinder converts the braking operation force to fluid pressure that is used to operate a frictional brake unit to generate a frictional braking torque. The frictional braking torque can be moderated by motorized power assist control of the master cylinder.

Accordingly, braking force control is performed to supply a target braking torque based on a braking operation or the like. The regenerative braking system supplies a regenerative braking torque, and the frictional braking system which is moderated by motorized power assist control supplies frictional braking torque to compensate for any braking torque shortfall.

The motorized power assist-type master cylinder uses a motorized booster piston to push in a primary piston of the master cylinder. As a result, fluid pressure fluctuation during the motorized power assist control described above can cause variations in braking operation force. These variations can include variations in brake pedal effort which can adversely affect the feel of the braking operation. Therefore, when it is necessary to vary the frictional braking torque in response to variations in the regenerative braking torque, the fluid pressure fluctuation varies the brake pedal effort. Accordingly, the feel of the braking operation is adversely affected.

However, the system described in Japanese Laid-Open Patent Application No. 2009-154814 performs operations in an attempt to mitigate this variation in brake pedal effort. Specifically, a spring is placed between the primary piston and the motorized booster piston. Hence, the elastic deformation of the spring prevents the force that accompanies fluid pressure fluctuation from being fully transmitted to the brake pedal. Through this configuration, the variation of brake pedal effort due to variations in the apportionment of braking torque between regenerative braking and frictional braking can be mitigated. Thus, adverse effects on the feel of the braking operation can be reduced.

SUMMARY

However, in the conventional braking force control apparatus described above, although the feel of the braking operation can be somewhat improved, the spring configuration generally cannot sufficiently compensate for sudden fluid pressure fluctuations due to the motorized power assist control. Accordingly, variations in brake pedal effort cannot be adequately mitigated, and the braking operation generally feels uncomfortable to the driver.

In view of the foregoing, an object of the present invention is to provide a braking force control apparatus that is capable of mitigating variations in braking operation force even during sudden transient variations in regenerative braking torque, so that the feel of the braking operation is not uncomfortable to the driver.

In view of the state of the known technology, a vehicle brake control system basically includes a regenerative braking control component, a frictional braking control component, a calculating component and a controlling component. The regenerative braking control component is configured to control a regenerative braking device to provide a regenerative braking torque. The frictional braking control component is configured to control a frictional braking device to provide a frictional braking torque. The calculating component is configured to calculate a regenerative braking torque filter processing value based on a fluctuation frequency of the regenerative braking torque. The controlling component is configured, during a first condition, to operate a motorized power assist control device based on the regenerative braking torque filter processing value, instead of based on the regenerative braking torque, to moderate the frictional braking torque, such that the regenerative braking torque and the moderated frictional braking torque provide a target braking torque that is based on a braking operation.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
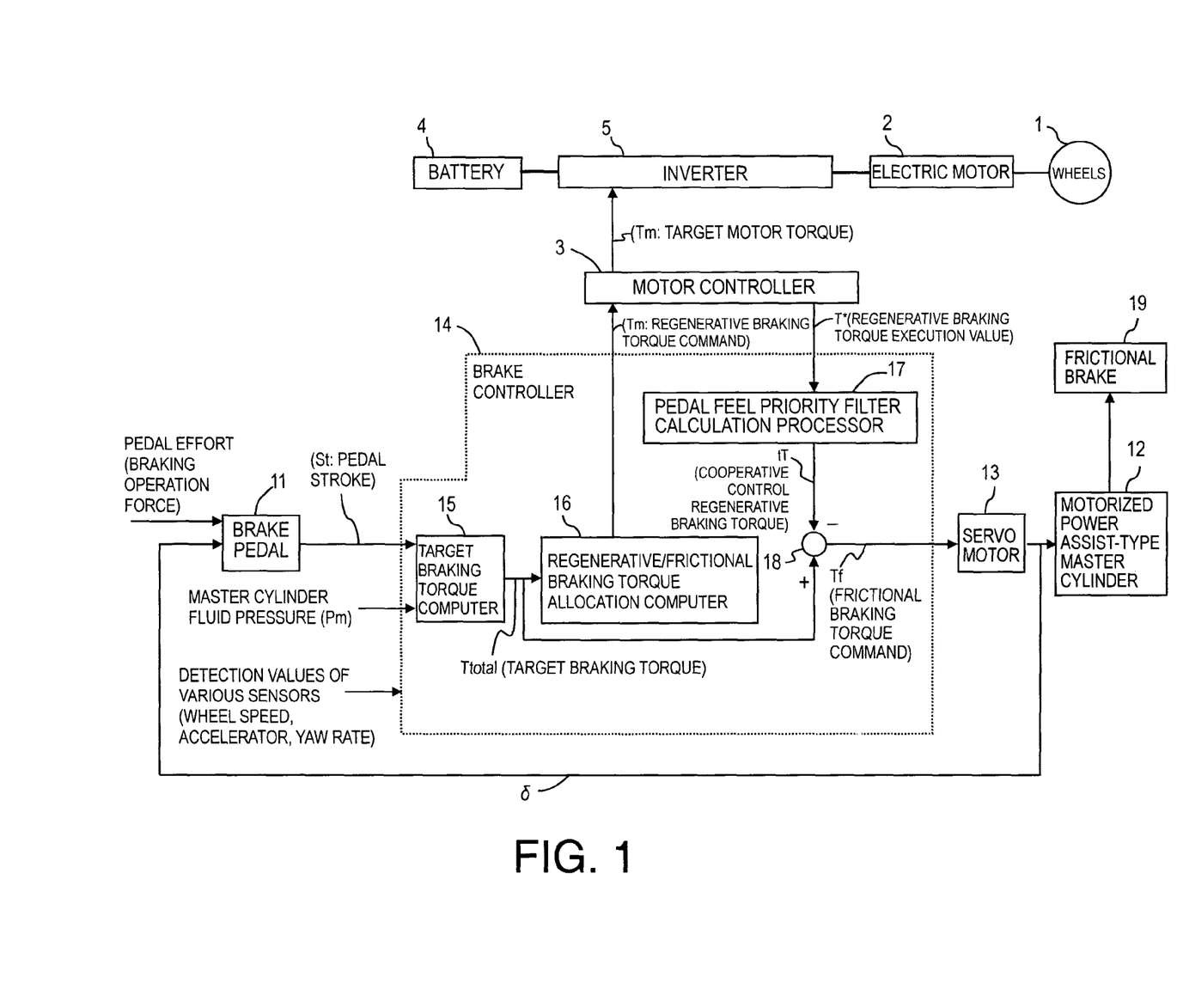
FIG. 1 is a functional block diagram showing an example of a vehicle brake control system according to a disclosed embodiment.

FIG. 1 is a functional block diagram illustrating an example of a vehicle brake control system according to a disclosed embodiment. The vehicle brake control system can be employed in any suitable type of vehicle, such as a car, truck, van, SUV and so on having wheels 1. In the example shown in FIG. 1, at least one of the wheels 1 is driven by an electric motor 2. However, the vehicle can instead be a hybrid vehicle as understood in the art, or any other type of suitably powered vehicle.

To control the driving of the electric motor 2, a motor controller 3 converts the electrical power of a battery 4 (e.g., a condenser) from direct current to alternating current through the use of, for example, an inverter 5 or any other suitable device. The inverter 5 thus supplies the alternating-current power to the electric motor 2 as controlled by the controller 3. Hence, the controller 3 controls the driving of the electric motor 2 so that the torque of the electric motor 2 equals or at least substantially equals a target motor torque Tm provided by the motor controller 3.

The target motor torque Tm provided by the motor controller 3 can include, for example, a torque value and information relating to a rotation direction to control the forward and reverse states of the vehicle. When the vehicle is stopped, the torque value can be zero. When the target motor torque Tm indicates that regenerative braking from the electric motor 2 should be applied in response to a regenerative braking torque command T shown in FIG. 1, the motor controller 3 imparts a power generation load to the electric motor 2 via the inverter 5. The power generation load that is imparted to the electric motor 2 has a value so as to not overcharge the battery 4 while imparting a regenerative braking torque to the wheels 1. In addition, the motor controller 3 at this time converts the electrical power generated through regenerative braking by the electric motor 2 from alternating current to direct current through the use of the inverter 5. The motor controller 3 can thus use this direct current to charge the battery 4.

In addition to the regenerative braking described above, the vehicle can also be braked by frictional braking. The combination of the regenerative braking system and the frictional braking system can be referred to as, for example, a combination system or a combination brake system as understood in the art.

The frictional braking system in this example includes brake pedal 11 and a motorized power assist-type master cylinder 12 as shown in FIG. 1. Certain components of the frictional braking system not otherwise described herein can be the same or similar to those described in Japanese Laid-Open Patent Application No. 2009-154814 discussed above.

When the driver depresses the brake pedal 11, the brake pedal 11 generates a pedal stroke St according to the pedal effort (the braking operation force). The motorized power assist-type master cylinder 12 operates in response to the pedal stroke St, and a master cylinder fluid pressure Pm is generated by the pushing stroke of a primary piston (not shown). In other words, the motorized power assist-type master cylinder 12 converts the tread force (the braking operation force) of the brake pedal 11 to a master cylinder fluid pressure Pm. The master cylinder fluid pressure Pm is fed to brake calipers or other frictional brake units 19 associated with the wheels 1. A frictional brake unit 19 is operated by the fluid pressure to impart a frictional braking torque on the wheels 1. Thus, the motorized power assist-type master cylinder 12 and associated components can function as a frictional braking control component that is configured to control a frictional braking device 19 to provide a frictional braking torque.

The motorized power assist-type master cylinder 12 in this example includes a servo motor 13 for administering motorized power assist control. Also in this example, the servo motor 13 is shown separate from the motorized power assist-type master cylinder 12 in FIG. 1 for the sake of clarity. However, the servo motor 13 can be included in the motorized power assist-type master cylinder 12. The servo motor 13 pushes the primary piston to perform the power assist function as discussed above. Consequently, the motorized power assist-type master cylinder 12 can moderate and adjust the master cylinder fluid pressure Pm (i.e., the frictional braking torque) through motorized power assist control from a reference fluid pressure (reference braking torque) which is in accordance with the tread force (braking operation force) of the brake pedal 11.

In this example, a brake controller 14 can administer the motorized power assist control discussed above. The brake controller 14 can include a target braking torque computer 15, a regenerative/frictional braking torque allocation computer 16, a pedal feel priority filter calculation processor 17 and a subtractor 18 as shown in FIG. 1.

It should also be noted that the motor controller 3 and the components of the brake controller 14, such as the target braking torque computer 15, the regenerative/frictional braking torque allocation computer 16 and the pedal feel priority filter calculation processor 17 shown in FIG. 1, and any other controller discussed herein, can each include or share, for example, a microcomputer with a control program that controls and interacts with the components of the vehicle as discussed herein. The motor controller 3, the brake controller 14, the target braking torque computer 15, the regenerative/frictional braking torque allocation computer 16, the pedal feel priority filter calculation processor 17, and any other controller discussed herein can also each include or share other conventional components such as an input interface circuit, an output interface circuit, and storage devices such as a ROM (Read Only Memory) device and a RAM (Random Access Memory) device. The RAM and ROM store processing results and control programs that are run by the motor controller 3, the brake controller 14, the target braking torque computer 15, the regenerative/frictional braking torque allocation computer 16 and the pedal feel priority filter calculation processor 17. Furthermore, the motor controller 3, the brake controller 14, the target braking torque computer 15, the regenerative/frictional braking torque allocation computer 16, the pedal feel priority filter calculation processor 17 and any other controller discussed herein are operatively coupled to the components of the vehicle in a conventional manner. It will be apparent to those skilled in the art from this disclosure that the precise structure and algorithms for the motor controller 3, the brake controller 14, the target braking torque computer 15, the regenerative/frictional braking torque allocation computer 16, the pedal feel priority filter calculation processor 17 and any other controller discussed herein can be any combination of hardware and software that will carry out the functions of the embodiments discussed herein.

In this example, the target braking torque computer 15 calculates the target braking torque Ttotal of the vehicle as desired by the driver from the pedal stroke St and master cylinder fluid pressure Pm. The regenerative/frictional braking torque allocation computer 16 calculates a regenerative braking torque command Tm based on the target braking torque Ttotal and the detection values provided by various sensors. These detection values can include the wheel speed as provided by a wheel speed sensor, the lateral acceleration of the vehicle as provided by a lateral acceleration sensor, and the yaw rate of the vehicle as provided by a yaw rate sensor.

The brake controller 14 and, in particular, the regenerative/frictional braking torque allocation computer 16 provides the regenerative braking torque command Tm to the motor controller 3. The motor controller 3 calculates the target motor torque Tm based on the regenerative braking torque command Tm. Thus, the motor controller 3 controls the driving of the electric motor 2 via the inverter 5 based on the target motor torque Tm to impart the regenerative braking torque on the wheels 1. Accordingly, any or all of the target braking torque computer 15, the regenerative/frictional braking torque allocation computer 16 and the motor controller 3 can function as a regenerative braking control component that is configured to control a regenerative braking device, such as the electric motor 2, to provide a regenerative braking torque.

As further shown, the motor controller 3 calculates a regenerative braking torque execution value T* imparted to the wheels 1 undergoing regenerative braking. The motor controller 3 thus provides the regenerative braking torque execution value T* to the pedal feel priority filter calculation processor 17.

Figure 2:
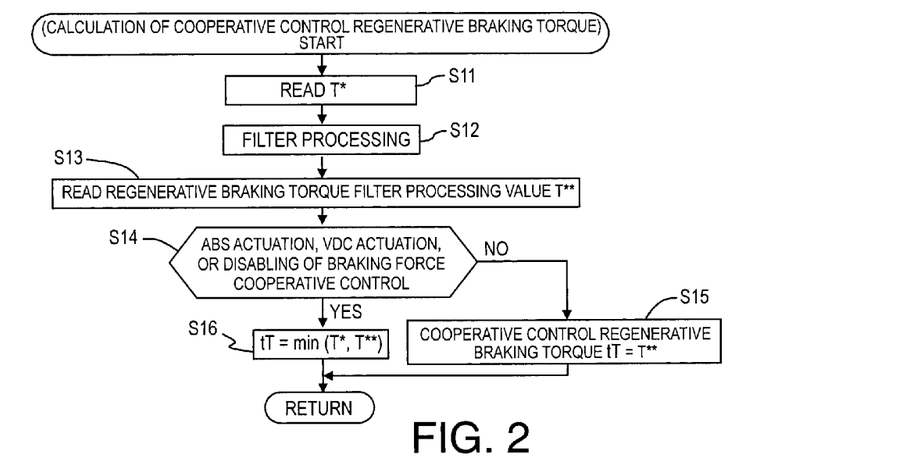
FIG. 2 is a flowchart showing an example of a control process that can be executed by the pedal feel priority filter calculation processor of the vehicle brake control system shown in FIG. 1 to compute the regenerative braking torque according to a disclosed embodiment.

The pedal feel priority filter calculation processor 17 can execute the control operations shown in FIG. 2. The pedal feel priority filter calculation processor 17 applies a predetermined filter processing to the regenerative braking torque execution value T*, and computes a cooperative control regenerative braking torque tT. Accordingly, the pedal feel priority filter calculation processor 17 can improve the feel of the braking operation during the braking force control for supplying the target braking torque Ttotal by allowing for cooperation between regenerative braking and frictional braking.

The feel of the braking operation during braking force control will first be described. In general, during braking force control, the regenerative braking torque execution value T* (or the regenerative braking torque command Tm) is used without modification. As shown in FIG. 1, the subtractor 18 determines a difference between the regenerative braking torque execution value T* and the target braking torque Ttotal. In this example, the subtractor 18 determines the difference by subtracting the regenerative braking torque execution value T* from the target braking torque Ttotal. The difference output from the subtractor 18 is designated as a frictional braking torque command Tf. The frictional braking torque command Tf therefore controls the servo motor 13 to achieve a frictional braking torque based on the command value Tf.

Figure 3A:
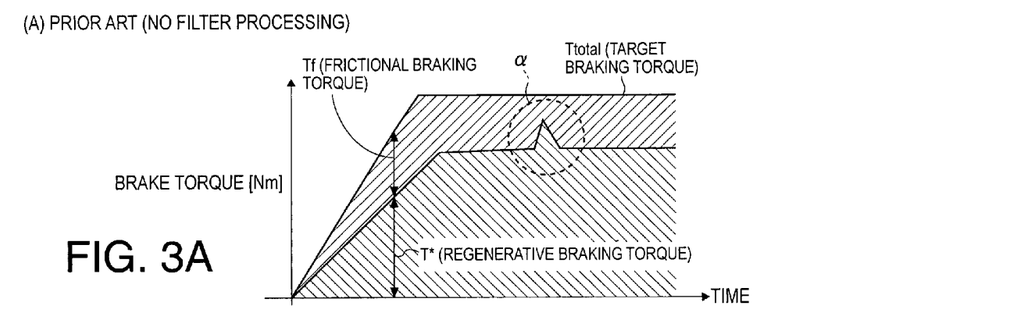
FIG. 3A is an operational time chart illustrating an example of a relationship between the regenerative braking torque, the frictional braking torque, and the target braking torque with respect to time when the pedal feel priority filter calculation processor does not perform the control process shown in FIG. 2.

As discussed above, it is possible for the regenerative braking torque execution value T* to be used without modification. However, the regenerative braking torque execution value T* can undergo a sudden transient variation as shown in region α of FIG. 3A. When this occurs, the frictional braking torque command Tf obtained by subtracting the regenerative braking torque execution value T* from the target braking torque Ttotal also changes suddenly according to the same or about the same time variation.

As discussed above, the motorized power assist-type master cylinder 12 supplies the frictional braking torque command Tf through motorized power assist control during which the servo motor 13 causes the primary piston to stroke. Therefore, the sudden variation of the frictional braking torque command Tf can cause the brake pedal effort (braking operation force) to change suddenly through the path δ shown in FIG. 1 via the sudden variation of the master cylinder fluid pressure. As a result, the feel of the braking operation of the brake pedal 11 can be adversely affected, and the driver may experience discomfort with the braking operation.

In order to mitigate this problem, the pedal feel priority filter calculation processor 17 can execute the exemplary operations shown in FIG. 2. By performing these operations, the pedal feel priority filter calculation processor 17 can perform low-pass filtering on the regenerative braking torque execution value T* in accordance with the fluctuation frequency of the regenerative braking torque execution value T*. The pedal feel priority filter calculation processor 17 can compute a cooperative control regenerative braking torque tT in the manner described below. Furthermore, the pedal feel priority filter calculation processor 17 can use the cooperative control regenerative braking torque tT in braking force cooperative control by motorized power assist control. Furthermore it should be noted that the filtering need not be a low-pass filtering. Rather, any suitable filtering operation that is capable of setting a primary delay in the regenerative braking torque execution value T* can be used. Moreover, although the pedal feel priority filter calculation processor 17 performs the processing shown in FIG. 2 in this example, the processing can be performed all or in part by any other suitable component in the vehicle brake control system.

In step S11 of FIG. 2, the pedal feel priority filter calculation processor 17 reads the regenerative braking torque execution value T* provided by the motor controller 3. In step S12, the pedal feel priority filter calculation processor 17 can perform filter processing on the regenerative braking torque execution value T* read in step S11, in accordance with the fluctuation frequency of the regenerative braking torque execution value T*. Thus, the pedal feel priority filter calculation processor 17 can function as a calculating component that is configured to calculate a regenerative braking torque filter processing value based on a fluctuation frequency of the regenerative braking torque. In step S13, the pedal feel priority filter calculation processor 17 thus reads the regenerative braking torque filter processing value T** to which the filter processing has been applied. Consequently, steps S12 and S13 can be considered as performing regenerative braking torque filter processing value computation.

In step S14, a determination is made based on the detection values of the various sensors shown in FIG. 1 whether an anti-skid control device (ABS) has been actuated. As understood in the art, an ABS can adjust the braking torque to prevent brake lock-up of the wheels 1. A determination is also made in step S14 as to whether a vehicle handling control device (VDC) for adjusting the braking torque to control vehicle handling is actuated. Furthermore, a determination is made in step S14 as to whether braking force control by motorized power assist control is disabled by a condition such as disabling of regenerative braking due to full charging of the battery 4.

When a determination is made in step S14 that a first condition exists in which the ABS and the VDC are not actuated, and the braking force cooperative control is not disabled, the regenerative braking torque filter processing value T** read in step S13 is set as the cooperative control regenerative braking torque tT in step S15. However, when a determination is made in step S14 that the ABS or the VDC is actuated, or the braking force cooperative control is disabled (e.g., a second condition exists), the processing continues to step S16. In step S16, the smaller value min(T*, T**) of the regenerative braking torque execution value T* read in step S11 and the regenerative braking torque filter processing value T** read in step S13 is set as the cooperative control regenerative braking torque tT.

Once the processing shown in FIG. 2 has been completed, the pedal feel priority filter calculation processor 17 provides the calculated cooperative control regenerative braking torque tT to the subtractor 18. The subtractor 18 thus subtracts the cooperative control regenerative braking torque tT from the target braking torque Ttotal to produce the frictional braking torque command Tf. The subtractor 18 provides the frictional braking torque command Tf to the servo motor 13. Accordingly, the servo motor 13 moderates and adjusts the master cylinder fluid pressure Pm from a reference pressure that was based on the tread force (braking operation force) of the brake pedal 11 to provide the frictional braking torque based on the command value Tf. That is, the servo motor 13 performs motorized power assist control of the motorized power assist-type master cylinder 12 to provide the frictional braking torque based on the command value Tf.

Figure 3B:
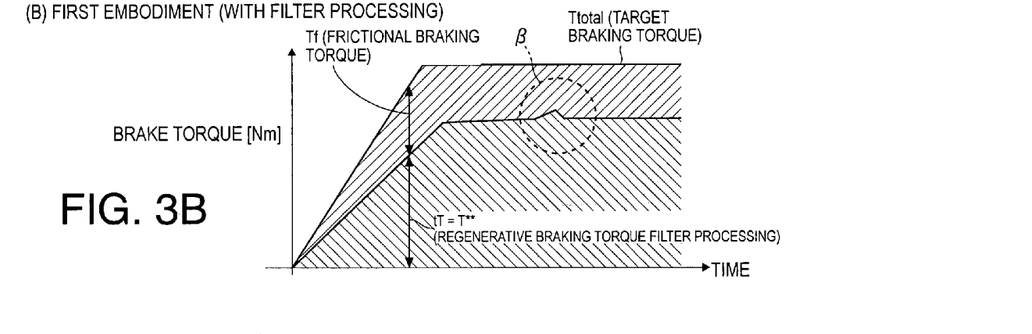
FIG. 3B is an operational time chart illustrating an example of a relationship between the regenerative braking torque, the frictional braking torque, and the target braking torque with respect to time when the pedal feel priority filter calculation processor performs the control process shown in FIG. 2.

Accordingly, the vehicle brake control system described above provides the target braking torque Ttotal by cooperation of regenerative braking with the frictional braking torque Tf. The frictional braking torque Tf is obtained by subtracting the cooperative control regenerative braking torque tT from the target braking torque Ttotal. As discussed above, the regenerative braking torque filter processing value T is set as the cooperative control regenerative braking torque tT (step S15) when the ABS and VDC are not actuated and the braking force cooperative control is not disabled (step S14). Therefore, the frictional braking torque command Tf is calculated from the target braking torque Ttotal and the regenerative braking torque filter processing value T, which is substituted for the regenerative braking torque execution value T* as shown in FIG. 3B. Also, the frictional braking torque command Tf is used for braking force control to supply the target braking torque Ttotal. Accordingly, the components of the brake controller 14 can be considered to function as a controlling component that is configured, during the first condition as described above, to operate a motorized power assist control device based on the regenerative braking torque filter processing value, instead of based on the regenerative braking torque, to moderate the frictional braking torque, such that the regenerative braking torque and the moderated frictional braking torque provide a target braking torque that is based on the braking operation.

Moreover, the motorized power assist-type master cylinder 12 (servo motor 13) can use the regenerative braking torque filter processing value T** instead of the regenerative braking torque execution value T* during braking force cooperative control as discussed above. Therefore, even when the regenerative braking torque execution value T* undergoes a sudden transient variation as shown in region α of FIG. 3A, the variation in the cooperative control regenerative braking torque tT used in the braking force cooperative control is gradual and small, as shown in region β of FIG. 3B. Consequently, a gradual, small variation also occurs in the frictional braking torque command Tf that is obtained by subtracting the cooperative control regenerative braking torque tT (regenerative braking torque filter processing value T**) from the target braking torque Ttotal.

The actuation (motorized power assist control effect) of the servo motor 13 for supplying the frictional braking torque command Tf is therefore gradual and small. Furthermore, the variation in tread force (variation in braking operation force) of the brake pedal 11 by motorized power assist control of the master cylinder 12 can be adequately mitigated. This can prevent the feel of the braking operation from being uncomfortable to the driver.

On the other hand, when the ABS or the VDC is actuated during the braking force cooperative control as discussed above, or the braking force cooperative control is disabled by a condition such as the disabling of regenerative braking (step S14) which can be referred to as the second condition discussed above, the smaller min(T*, T**) of the regenerative braking torque execution value T* and the regenerative braking torque filter processing value T** is set as the cooperative control regenerative braking torque tT (step S16). The brake controller 14, which can be considered to function as the controlling component, is further configured, during the second condition, to operate the motorized power assist control device based on a smaller of the regenerative braking torque and the regenerative braking torque filter processing value, to moderate the frictional braking torque. Thus, the regenerative braking torque and the moderated frictional braking torque provide the target braking torque that is based on the braking operation.

Furthermore, if the ABS has been activated, the pedal feel priority filter calculation processor 17 can be considered to function as an anti-skid determination component that is configured to determine a third condition during which a braking torque being applied to wheels of a vehicle including the vehicle brake control system is adjusted to prevent brake lock-up of the wheels. In this event, the brake controller 14 can be considered to function as the controlling component which is further configured, during the third condition, to operate the motorized power assist control device based on a smaller of the regenerative braking torque and the regenerative braking torque filter processing value, to moderate the frictional braking torque. Thus, the regenerative braking torque and the moderated frictional braking torque provide the target braking torque that is based on the braking operation while the anti-skid determination component is adjusting the braking torque being applied to wheels to prevent brake lock-up of the wheels.

In addition, if the VDC has been activated, the pedal feel priority filter calculation processor 17 can be considered to function as a vehicle handling determination component that is configured to determine a fourth condition during which a braking torque used for vehicle handling control of a vehicle including the vehicle brake control system is adjusted. In this event, the brake controller 14 can be considered to function as the controlling component which is further configured, during the fourth condition, to operate the motorized power assist control device based on a smaller of the regenerative braking torque and the regenerative braking torque filter processing value, to moderate the frictional braking torque. Thus, the regenerative braking torque and the moderated frictional braking torque provide the target braking torque that is based on the braking operation while the vehicle handling control component is adjusting the braking torque used for vehicle handling control.

Figure 4:
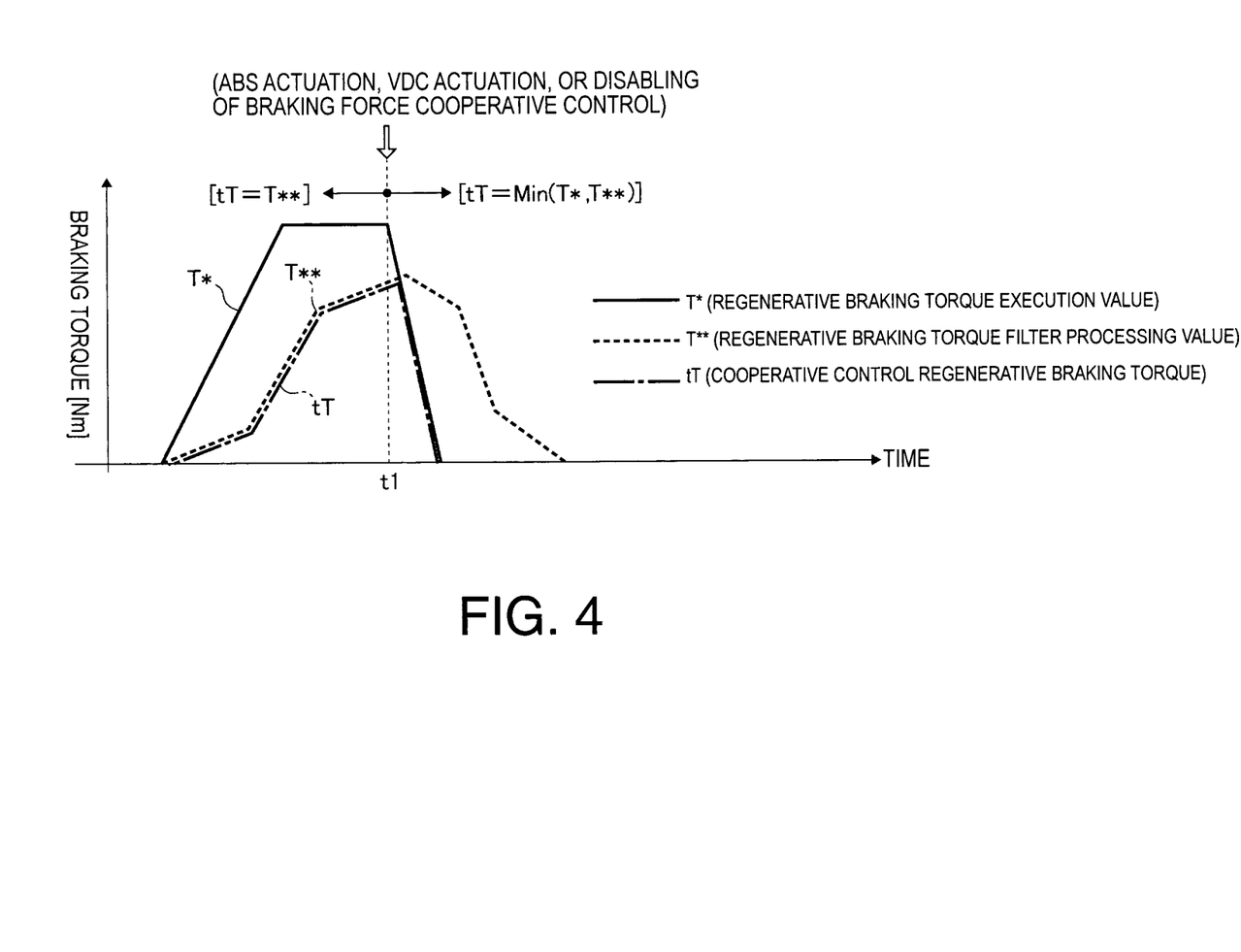
FIG. 4 is an operational time chart illustrating an example of the regenerative braking torque with respect to time that is achieved when the pedal feel priority filter calculation processor performs the control process shown in FIG. 2.

As shown in FIG. 4, the regenerative braking torque execution value T* and the regenerative braking torque filter processing value T are indicated by a solid line and a dashed line, respectively. As indicated, the cooperative control regenerative braking torque tT is the same as the regenerative braking torque filter processing value T at or before time t1 as indicated by the dotted dashed line.

Beginning at time t1, the ABS or VDC is actuated, or the braking force cooperative control is disabled by a condition such as the disabling of regenerative braking. Accordingly, the cooperative control regenerative braking torque tT becomes the same as the smaller min(T*, T**) of the regenerative braking torque execution value T* and the regenerative braking torque filter processing value T** as described above. As indicated by the dotted dashed line in FIG. 4, when the value of the regenerative braking torque execution value T* falls below the value of the regenerative braking torque filter processing value T**, the cooperative control regenerative braking torque tT becomes the value of T*. Thus, the frictional braking torque command Tf is calculated by subtracting the min(T*, T**) from the target braking torque Ttotal. As discussed above, the frictional braking torque command Tf is used for the braking force cooperative control to provide the target braking torque Ttotal.

As is apparent from FIG. 4, the cooperative control regenerative braking torque tT is reduce beginning at time t1. Therefore, the frictional braking torque can be rapidly restored when the ABS or VDC is actuated or the braking force cooperative control is disabled by a condition such as the disabling of regenerative braking. Consequently, the braking distance during actuation of the anti-skid control device (ABS) that accompanies emergency braking can be shorted. Also, vehicle handling can be promptly stabilized by actuation of the VDC. Furthermore, a rapid transition to frictional braking can be made when braking force cooperative control is disabled.

Figure 5:
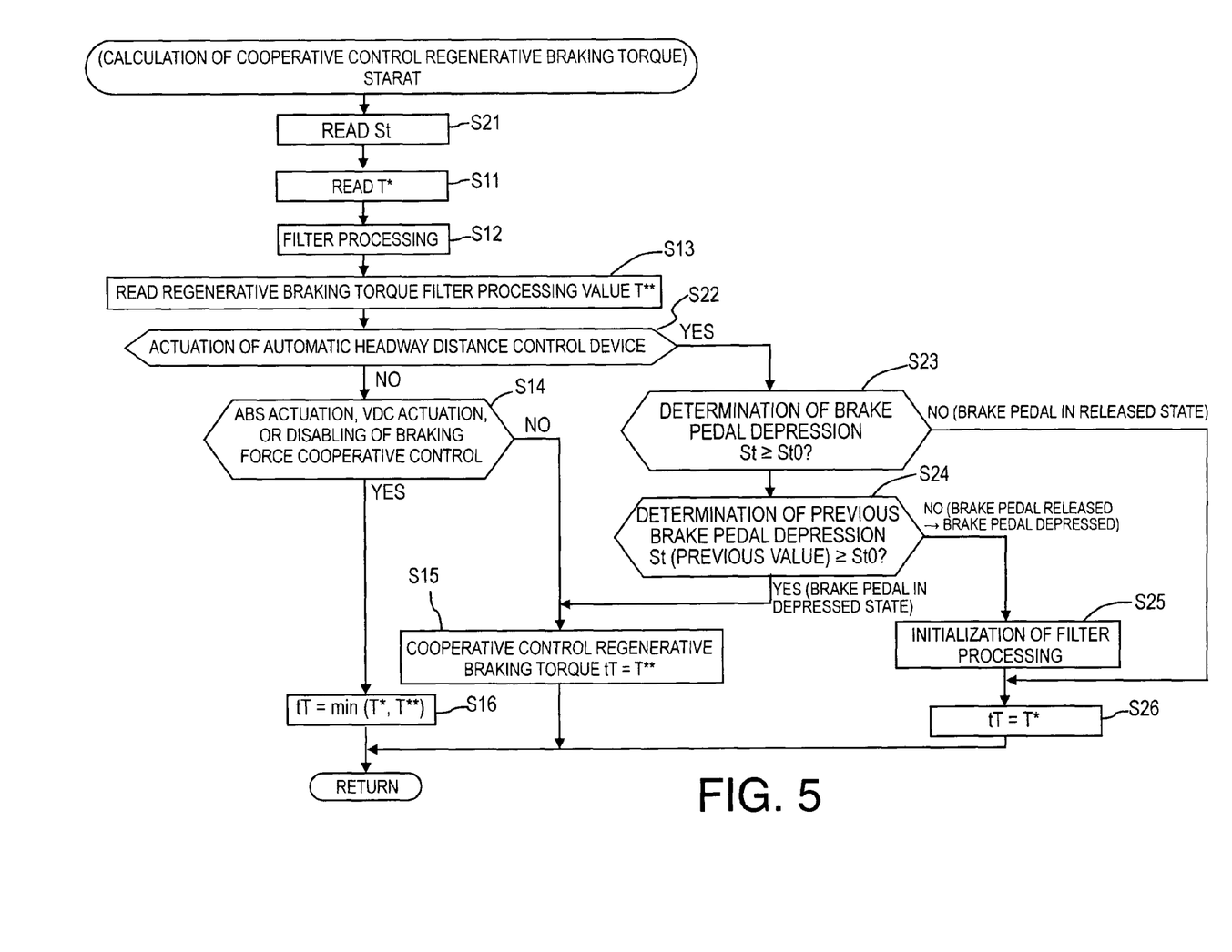
FIG. 5 is a flowchart showing an example of a control process that can be executed by the pedal feel priority filter calculation processor of the vehicle brake control system shown in FIG. 1 to compute the regenerative braking torque according to another disclosed embodiment.

FIG. 5 is a flowchart showing an example of a control process that can be executed by, for example, the pedal feel priority filter calculation processor 17 to compute the regenerative braking torque tT that is used for braking force cooperative control. As indicated, the operations S11 through S16 correspond to those of the flowchart shown in FIG. 2. The process shown in FIG. 5 further includes steps S21 through S26 which will be discussed below. As shown, step S21 is performed immediately before or at least prior to step S11. In step S21, the depression stroke St (see FIG. 1) of the brake pedal 11 is read.

In steps S11 through S13, the same or a similar processing is performed as in the steps indicated by the same reference numerals in FIG. 2. In other words, the regenerative braking torque execution value T* is read in step S11. The regenerative braking torque filter processing value T** that is the result of filter processing of the regenerative braking torque execution value T* is calculated in step S12. The regenerative braking torque filter processing value T** is read in step S13.

As further shown, step S22 is performed immediately after or at least subsequent to step S13. In step S22, the processing determines whether a fifth condition exists in which an automatic headway distance control device (ACC) for automatically generating a braking torque for controlling the headway distance is actuated. Accordingly, the pedal feel priority filter calculation processor 17 can be considered to function as an automatic headway distance condition determination component that is configured to determine a fifth condition during which a braking torque used for automatic control of headway distance for a vehicle including the vehicle brake control system is generated.

It should be noted that during braking which accompanies actuation of the ACC, since the driver is not depressing the brake pedal 11, the feel of the braking operation is not relevant. Therefore, when the processing determines in step S22 that the ACC is not actuated, the processing continues to steps S14 through S16 as discussed above.

However, when the processing determines in step S22 that the ACC is actuated, the processing continues to step S23. In the processing beginning in step S23, the cooperative control regenerative braking torque tT is calculated as described below, and the cooperative control regenerative braking torque tT is used for braking force cooperative control. In step S23, the processing determines whether the brake pedal 11 is currently depressed based on whether the brake pedal stroke St read in step S21 is equal to or greater than a depression determination value St0. When the brake pedal 11 is currently depressed, the processing determines in step S24 whether the previous brake pedal stroke St was a state of brake pedal depression. That is, the processing determines whether the state of brake pedal depression is continuing, or whether the brake pedal 11 is being currently depressed from a released state. In this example, the determination is made based on whether the previous brake pedal stroke St (previous value) is equal to or greater than the depression determination value St0.

When the processing determines in step S24 that the brake pedal 11 is depressed from a released state, the filter processing performed previously in step S12 is initialized in step S25 that is performed once at the start of the brake pedal depression. In step S26, the regenerative braking torque execution value T* is set as the cooperative control regenerative braking torque tT and used for the braking force cooperative control shown in FIG. 1 as discussed above. Accordingly, the brake controller 14 can be considered to function as the controlling component that is further configured, during the fifth condition, to operate the motorized power assist control device based on the regenerative braking torque, instead of the regenerative braking torque filter processing value, to moderate the frictional braking torque. Thus, the regenerative braking torque and the moderated frictional braking torque provide the target braking torque that is based on the braking operation while the automatic headway distance condition determination component.

However, when the processing determines in step S24 that the depressed state of the brake pedal 11 is continuing, the feel of the braking operation is to be taken into consideration. Hence, the processing continues to step S15, and the regenerative braking torque filter processing value T** calculated in step S12 after the initialization in step S25 is set as the cooperative control regenerative braking torque tT. This cooperative control regenerative braking torque tT is used for the braking force cooperative control as shown in FIG. 1.

On the other hand, when the processing determines in step S23 that the brake pedal stroke St is less than the depression determination value St0, the processing determines that the brake pedal 11 is not depressed and is thus in the released state. Since the feel of the braking operation need not be considered at this time, the processing continues to step S26. Thus, the regenerative braking torque execution value T* is set as the cooperative control regenerative braking torque tT and used for the braking force cooperative control as shown in FIG. 1.

In other words, after the braking operation has been performed, the brake controller 14 (controlling component) is further configured to operate the motorized power assist control device based on the regenerative braking torque filter processing value, instead of the regenerative braking torque, to moderate the frictional braking torque. Thus, the regenerative braking torque and the moderated frictional braking torque provide the target braking torque that is based on the braking operation after the automatic headway distance has finished generating the braking torque used for the automatic control of the headway distance.

Accordingly, by performing the processing shown in FIG. 5, the target braking torque Ttotal can be provided in the same or similar manner as by the processing shown in FIG. 2. That is, the target braking torque Ttotal can be provided by cooperation of regenerative braking with the frictional braking torque Tf that is obtained by subtracting the cooperative control regenerative braking torque tT from the target braking torque Ttotal as described above. Furthermore, when the ACC is not actuated (step S22), the same or similar processing is performed in steps S14 through S16 as in FIG. 2.

In addition, when a determination is made in step S22 that the ACC is actuated, and a determination is made in step S23 that the brake pedal 11 is in the released state, the regenerative braking torque execution value T* is set as the cooperative control regenerative braking torque tT in step S26. This setting for the cooperative control regenerative braking torque tT is used for the braking force cooperative control as shown in FIG. 1.

Figure 6:
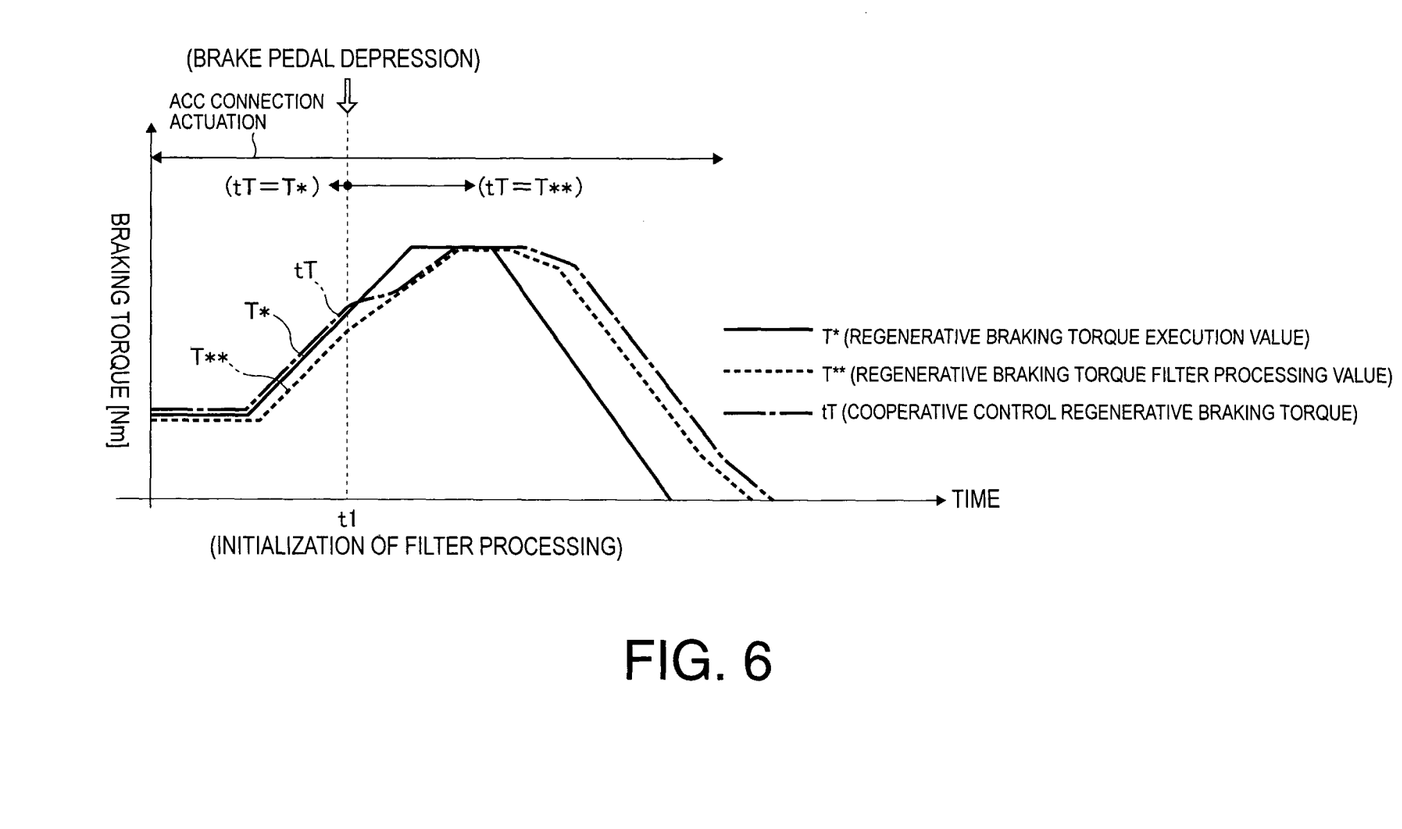
FIG. 6 is an operational time chart illustrating an example of the regenerative braking torque with respect to time that is achieved when the pedal feel priority filter calculation processor performs the control process shown in FIG. 5.

FIG. 6 is an exemplary time chart for operation during continuous actuation of the ACC. As shown, until time t1 of brake pedal depression, the cooperative control regenerative braking torque tT has the same value as the regenerative braking torque execution value T*. Thus, the braking force cooperative control as shown in FIG. 1 is performed accordingly. That is, the braking force cooperative control is based on the regenerative braking torque execution value T* to which the filter processing has not been applied. Accordingly, fluctuations in acceleration in the front-rear direction of the vehicle that occur during torque switching between regenerative braking torque and frictional braking torque can be reduced.

In addition, the braking force cooperative control that is based on the regenerative braking torque execution value T* can adversely affect the feel of the braking operation as previously described. Hence, when the brake pedal is currently released, there is no need to take the feel of the braking operation into account.

However, when a determination is made in step S22 that the ACC is actuated, but a determination is made in step S23 that the brake pedal 11 is depressed, the regenerative braking torque filter processing value T** is set as the cooperative control regenerative braking torque tT in step S15. This set value for the cooperative control regenerative braking torque tT is used for the braking force cooperative control as shown in FIG. 1.

Beginning at time t1 in FIG. 6 when the brake pedal is depressed, the cooperative control regenerative braking torque tT has the same value as the regenerative braking torque filter processing value T after initialization. The braking force cooperative control as shown in FIG. 1 is performed accordingly. That is, the braking force cooperative control is based on the regenerative braking torque filter processing value T to which filter processing has been applied after the aforementioned initialization. Through this configuration, even when a sudden transient variation occurs in the regenerative braking torque execution value T*, as shown in region α of FIG. 3A, the variation of the cooperative control regenerative braking torque tT used for braking force cooperative control is gradual and small, as previously described with reference to region β of FIG. 3B. Consequently, the variation is also gradual and small in the frictional braking torque command Tf that is obtained by subtracting the cooperative control regenerative braking torque tT (regenerative braking torque filter processing value T**) from the target braking torque Ttotal. Also, the actuation (motorized power assist control effect) of the servo motor 13 for supplying the frictional braking torque command Tf is gradual and small, which can prevent the feel of the braking operation from becoming uncomfortable to the driver.

As can be appreciated from the above, since the regenerative braking torque filter processing value obtained by applying filter processing can be used instead of the regenerative braking torque, the variation of the frictional braking torque can be gradual and small even when there is a sudden transient variation of the regenerative braking torque. Therefore, it is possible to adequately mitigate a variation in the motorized power assist-type braking operation force that is caused by the variation of the frictional braking torque. This can prevent the braking operation from feeling uncomfortable to the driver.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. The terms "detect" or "sense" and their variations as used herein to describe an operation or function carried out by a component, a section, a device or the like includes a component, a section, a device or the like that does not require physical detection or sensing, but rather includes determining, measuring, modeling, predicting or computing or the like to carry out the operation or function. The term "configured" as used herein to describe a component, section or part of a device includes hardware and/or software that is constructed and/or programmed to carry out the desired function. The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A vehicle brake control system comprising:
    a microcomputer including
        a regenerative/frictional braking torque allocation component configured to output a regenerative braking torque command based on at least a target braking torque in response to a driver braking operation;
        a regenerative braking control component configured to output a regenerative braking torque execution value based on the regenerative braking torque command, and to control a regenerative braking device based on the regenerative braking torque command to provide a regenerative braking torque;
        a frictional braking control component configured to output a frictional braking torque command to control a frictional braking device to provide a frictional braking torque;
        a calculating component configured to calculate a regenerative braking torque filter processing value by low-pass filtering of the regenerative braking torque execution value in accordance with based on a fluctuation frequency of the regenerative braking torque; and
        a controlling component that is configured, during a first condition, to operate a motorized power assist control device in accordance with the frictional braking torque command corresponding to a moderated frictional braking torque, which is calculated by subtracting based on the regenerative braking torque filter processing value from the target braking torque, and when the first condition is not met, instead of the controlling component is configured to operate the motorized power assist control device based on the regenerative braking torque to moderate the frictional braking torque.

2. The vehicle brake control system according to claim 1, wherein the microcomputer further includes:
    a detecting component configured to detect a second condition when regenerative braking by the regenerative braking device is to be disabled; and
    wherein the controlling component is further configured, during the second condition, to operate the motorized power assist control device based on a smaller of the regenerative braking torque and the regenerative braking torque filter processing value, to moderate the frictional braking torque, such that the regenerative braking torque and the moderated frictional braking torque provide the target braking torque that is based on the braking operation.

3. The vehicle brake control system according to claim 1, wherein the microcomputer further includes:
    an anti-skid determination component configured to determine a third condition during which a braking torque being applied to wheels of a vehicle including the vehicle brake control system is adjusted to prevent brake lock-up of the wheels; and
    wherein the controlling component is further configured, during the third condition, to operate the motorized power assist control device based on a smaller of the regenerative braking torque and the regenerative braking torque filter processing value, to moderate the frictional braking torque, such that the regenerative braking torque and the moderated frictional braking torque provide the target braking torque that is based on the braking operation while the anti-skid determination component is adjusting the braking torque being applied to wheels to prevent brake lock-up of the wheels.

4. The vehicle brake control system according to claim 1, wherein the microcomputer further includes:
    a vehicle handling determination component configured to determine a fourth condition during which a braking torque used for vehicle handling control of a vehicle including the vehicle brake control system is adjusted; and
    wherein the controlling component is further configured, during the fourth condition, to operate the motorized power assist control device based on a smaller of the regenerative braking torque and the regenerative braking torque filter processing value, to moderate the frictional braking torque, such that the regenerative braking torque and the moderated frictional braking torque provide the target braking torque that is based on the braking operation while the vehicle handling determination component is adjusting the braking torque used for vehicle handling control.

5. The vehicle brake control system according to claim 1, wherein the microcomputer further includes:
    an automatic headway distance condition determination component configured to determine a fifth condition during which a braking torque used for automatic control of headway distance for a vehicle including the vehicle brake control system is generated; and
    wherein the controlling component is further configured, during the fifth condition, to operate the motorized power assist control device based on the regenerative braking torque, instead of the regenerative braking torque filter processing value, to moderate the frictional braking torque, such that the regenerative braking torque and the moderated frictional braking torque provide the target braking torque that is based on the braking operation while the automatic headway distance condition determination component is detecting generation of the braking torque used for the automatic control of the headway distance.

6. The vehicle brake control system according to claim 5, wherein:
    after the braking operation has been performed, the controlling component is further configured to operate the motorized power assist control device based on the regenerative braking torque filter processing value, instead of the regenerative braking torque, to moderate the frictional braking torque, such that the regenerative braking torque and the moderated frictional braking torque provide the target braking torque that is based on the braking operation after the automatic headway distance condition determination component has finished generating the braking torque used for the automatic control of the headway distance.

7. The vehicle brake control system according to claim 2, wherein the microcomputer further includes:
    an anti-skid determination component configured to determine a third condition during which a braking torque being applied to wheels of a vehicle including the vehicle brake control system is adjusted to prevent brake lock-up of the wheels; and wherein the controlling component is further configured, during the third condition, to operate the motorized power assist control device based on a smaller of the regenerative braking torque and the regenerative braking torque filter processing value, to moderate the frictional braking torque, such that the regenerative braking torque and the moderated frictional braking torque provide the target braking torque that is based on the braking operation while the anti-skid determination component is adjusting the braking torque being applied to wheels to prevent brake lock-up of the wheels.

8. The vehicle brake control system according to claim 2, wherein the microcomputer further includes:

a vehicle handling determination component configured to determine a fourth condition during which a braking torque used for vehicle handling control of a vehicle including the vehicle brake control system is adjusted; and wherein the controlling component is further configured, during the fourth condition, to operate the motorized power assist control device based on a smaller of the regenerative braking torque and the regenerative braking torque filter processing value, to moderate the frictional braking torque, such that the regenerative braking torque and the moderated frictional braking torque provide the target braking torque that is based on the braking operation while the vehicle handling determination component is adjusting the braking torque used for vehicle handling control.

9. The vehicle brake control system according to claim 8, wherein the microcomputer further includes:

an automatic headway distance condition determination component configured to determine a fifth condition during which a braking torque used for automatic control of headway distance for a vehicle including the vehicle brake control system is generated; and wherein the controlling component is further configured, during the fifth condition, to operate the motorized power assist control device based on the regenerative braking torque, instead of the regenerative braking torque filter processing value, to moderate the frictional braking torque, such that the regenerative braking torque and the moderated frictional braking torque provide the target braking torque that is based on the braking operation while the automatic headway distance condition determination component is detecting generation of the braking torque used for the automatic control of the headway distance.

10. The vehicle brake control system according to claim 9, wherein:

after the braking operation has been performed, the controlling component is further configured to operate the motorized power assist control device based on the regenerative braking torque filter processing value, instead of the regenerative braking torque, to moderate the frictional braking torque, such that the regenerative braking torque and the moderated frictional braking torque provide the target braking torque that is based on the braking operation after the automatic headway distance condition determination component has finished generating the braking torque used for the automatic control of the headway distance.

11. The vehicle brake control system according to claim 3, wherein the microcomputer further includes:

a vehicle handling determination component configured to determine a fourth condition during which a braking torque used for vehicle handling control of a vehicle including the vehicle brake control system is adjusted; and wherein the controlling component is further configured, during the fourth condition, to operate the motorized power assist control device based on a smaller of the regenerative braking torque and the regenerative braking torque filter processing value, to moderate the frictional braking torque, such that the regenerative braking torque and the moderated frictional braking torque provide the target braking torque that is based on the braking operation while the vehicle handling determination component is adjusting the braking torque used for vehicle handling control.

12. The vehicle brake control system according to claim 11, wherein the microcomputer further includes:

an automatic headway distance condition determination component configured to determine a fifth condition during which a braking torque used for automatic control of headway distance for a vehicle including the vehicle brake control system is generated; and wherein the controlling component is further configured, during the fifth condition, to operate the motorized power assist control device based on the regenerative braking torque, instead of the regenerative braking torque filter processing value, to moderate the frictional braking torque, such that the regenerative braking torque and the moderated frictional braking torque provide the target braking torque that is based on the braking operation while the automatic headway distance condition determination component is detecting generation of the braking torque used for the automatic control of the headway distance.

13. The vehicle brake control system according to claim 12, wherein:

after the braking operation has been performed, the controlling component is further configured to operate the motorized power assist control device based on the regenerative braking torque filter processing value, instead of the regenerative braking torque, to moderate the frictional braking torque, such that the regenerative braking torque and the moderated frictional braking torque provide the target braking torque that is based on the braking operation after the automatic headway distance condition determination component has finished generating the braking torque used for the automatic control of the headway distance.

14. The vehicle brake control system according to claim 2, wherein the microcomputer further includes:

an automatic headway distance condition determination component configured to determine a fifth condition during which a braking torque used for automatic control of headway distance for a vehicle including the vehicle brake control system is generated; and wherein the controlling component is further configured, during the fifth condition, to operate the motorized power assist control device based on the regenerative braking torque, instead of the regenerative braking torque filter processing value, to moderate the frictional braking torque, such that the regenerative braking torque and the moderated frictional braking torque provide the target braking torque that is based on the braking operation while the automatic headway distance condition determination component is detecting generation of the braking torque used for the automatic control of the headway distance.

15. The vehicle brake control system according to claim 14, wherein:
after the braking operation has been performed, the controlling component is further configured to operate the motorized power assist control device based on the regenerative braking torque filter processing value, instead of the regenerative braking torque, to moderate the frictional braking torque, such that the regenerative braking torque and the moderated frictional braking torque provide the target braking torque that is based on the braking operation after the automatic headway distance condition determination component has finished generating the braking torque used for the automatic control of the headway distance.

16. The vehicle brake control system according to claim 3, wherein the microcomputer further includes:
an automatic headway distance condition determination component configured to determine a fifth condition during which a braking torque used for automatic control of headway distance for a vehicle including the vehicle brake control system is generated; and
wherein the controlling component is further configured, during the fifth condition, to operate the motorized power assist control device based on the regenerative braking torque, instead of the regenerative braking torque filter processing value, to moderate the frictional braking torque, such that the regenerative braking torque and the moderated frictional braking torque provide the target braking torque that is based on the braking operation while the automatic headway distance condition determination component is detecting generation of the braking torque used for the automatic control of the headway distance.

17. The vehicle brake control system according to claim 16, wherein:
after the braking operation has been performed, the controlling component is further configured to operate the motorized power assist control device based on the regenerative braking torque filter processing value, instead of the regenerative braking torque, to moderate the frictional braking torque, such that the regenerative braking torque and the moderated frictional braking torque provide the target braking torque that is based on the braking operation after the automatic headway distance condition determination component has finished generating the braking torque used for the automatic control of the headway distance.

18. The vehicle brake control system according to claim 4, wherein the microcomputer further includes:
an automatic headway distance condition determination component configured to determine a fifth condition during which a braking torque used for automatic control of headway distance for a vehicle including the vehicle brake control system is generated; and
wherein the controlling component is further configured, during the fifth condition, to operate the motorized power assist control device based on the regenerative braking torque, instead of the regenerative braking torque filter processing value, to moderate the frictional braking torque, such that the regenerative braking torque and the moderated frictional braking torque provide the target braking torque that is based on the braking operation while the automatic headway distance condition determination component is detecting generation of the braking torque used for the automatic control of the headway distance.

19. The vehicle brake control system according to claim 18, wherein:
after the braking operation has been performed, the controlling component is further configured to operate the motorized power assist control device based on the regenerative braking torque filter processing value, instead of the regenerative braking torque, to moderate the frictional braking torque, such that the regenerative braking torque and the moderated frictional braking torque provide the target braking torque that is based on the braking operation after the automatic headway distance condition determination component has finished generating the braking torque used for the automatic control of the headway distance.

\* \* \* \* \*